US008167317B2

(12) United States Patent
Fast et al.

(10) Patent No.: US 8,167,317 B2
(45) Date of Patent: May 1, 2012

(54) WHEELCHAIR ATTACHMENTS

(75) Inventors: Avital Fast, Glen Cove, NY (US); Devdas Shetty, West Hartford, CT (US); Moshe Raz, Tel Aviv (IL); Giora Rothman, Hod Hasharon (IL)

(73) Assignees: Montefiore Medical Center, Bronx, NY (US); The University of Hartford, West Hartford, CT (US)

( * ) Notice: Subject to any disclaimer, the term of this patent is extended or adjusted under 35 U.S.C. 154(b) by 0 days.

(21) Appl. No.: 12/803,188

(22) Filed: Jun. 21, 2010

(65) Prior Publication Data

US 2010/0259029 A1 Oct. 14, 2010

Related U.S. Application Data

(62) Division of application No. 11/697,934, filed on Apr. 9, 2007, now Pat. No. 7,766,342.

(60) Provisional application No. 60/790,596, filed on Apr. 7, 2006.

(51) Int. Cl.
*A61G 5/06* (2006.01)
*B62B 5/02* (2006.01)

(52) U.S. Cl. .... 280/5.28; 280/5.22; 280/5.3; 280/304.1; 280/DIG. 10

(58) Field of Classification Search ............... 280/3, 5.2, 280/5.22, 5.28, 5.3, 5.32, 6.155, 8.3, 43.13, 280/43.16, 86.1, 304.1, DIG. 10, 5.24; 74/2
See application file for complete search history.

(56) References Cited

U.S. PATENT DOCUMENTS

| | | | | |
|---|---|---|---|---|
| 572,658 | A | 12/1896 | Marx et al. | 280/5.28 |
| 857,696 | A | 6/1907 | Weinstein et al. | 280/5.28 |
| 2,123,707 | A | 7/1938 | Bloch | 16/44 |
| 3,133,742 | A | 5/1964 | Richison et al. | 280/5.28 |
| 3,279,812 | A | 10/1966 | Rizzuto | 280/5.2 |
| 3,438,641 | A | 4/1969 | Bradley | 280/5.28 |
| 3,494,440 | A | 2/1970 | Hanson | 180/8.2 |
| 4,326,622 | A | 4/1982 | Ellzey | 198/322 |
| 4,962,942 | A | 10/1990 | Barnett et al. | 280/5.28 |
| 5,338,048 | A | 8/1994 | Medina | 280/5.22 |
| 6,554,086 | B1 | 4/2003 | Goertzen | 180/65.1 |
| 7,520,347 | B2 | 4/2009 | Chambliss et al. | 180/8.2 |

*Primary Examiner* — Paul N Dickson
*Assistant Examiner* — Wesley Potter
(74) *Attorney, Agent, or Firm* — Wiggin and Dana LLP; Gregory S. Rosenblatt

(57) ABSTRACT

Attachments for a manual wheelchair are provided for navigating a wheelchair over obstacles and uneven terrain, such as a typical curb on a street. The attachments provide for regulating the movement of the wheelchair as the wheelchair descends the curb and to prevent the wheelchair from flipping over during such movement. The attachments include a front caster wheel slider assembly on each side of the wheelchair, a follower wheel assembly and a track belt damping bar. The front caster wheel slider assembly includes a piston that will quickly push the front caster wheels down after they roll over the top edge of the curb. The follower wheel assembly acts as a sensor that will release the piston in the assembly after the front caster wheels roll over the top edge of the curb. As the back wheels of the wheelchair roll over and down the curb, the track belt damping bar slows the descent of the wheelchair.

8 Claims, 11 Drawing Sheets

WHEELCHAIR ATTACHMENTS

CROSS REFERENCE TO RELATED APPLICATION(S)

This patent application is a division of U.S. patent application Ser. No. 11/697,934, titled "Wheelchair Attachments" that was filed on Apr. 9, 2007, and is now U.S. Pat. No. 7,766,342, which claims priority to U.S. Provisional Patent Application Ser. No. 60/790,596, that was filed on Apr. 7, 2006. Both the 60/790,596 and the 11/697,934 applications are incorporated by reference herein in their entireties.

U.S. GOVERNMENT RIGHTS

N.A.

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

Manual wheelchairs, such as the Quickie XTR, Quickie 2, Invacare Xtra and E&J Epic wheelchairs, are typically equipped with two main side wheels and two front caster wheels. The four wheels on most wheelchairs are arranged so that the seat of the wheelchair and the bottoms of the wheels remain even and level when the wheels are in contact with a level, even or flat ground surface. Such an arrangement works well when the wheelchair travels over flat ground and generally provides smooth transportation for a wheelchair occupant. However, when such a wheelchair travels over a curb, e.g., at the edge of a sidewalk onto a street, or otherwise moves from an upper surface to a lower surface, the wheel arrangement can cause the wheelchair to tip when the bottoms of the front caster wheels drop over the curb into a position that is at a different elevation, e.g., lower, than the level of the bottom of the main side wheels. Such tipping can present a potential danger to a wheelchair occupant and can cause accidents which may result in spinal or other injuries to a wheelchair occupant if the chair quickly drops down off the curb.

Improvements to manual wheelchairs have been previously proposed for ascending and descending curbs or other uneven surfaces, and navigating obstacles. One example is the device described in U.S. Pat. No. 4,962,942. Another example is a power wheelchair for traversing uneven terrain, such as the wheelchair described in. U.S. Pat. No. 6,554.086. However, those wheelchairs require electrical or computerized components or input from the wheelchair occupant.

BRIEF SUMMARY OF THE INVENTION

Embodiments of the present invention comprise one or more assemblies that are adapted to control a manual wheelchair's descent from an upper surface to a lower surface, such as a typical curb at the edge of a sidewalk. The assemblies can be provided as one or more standalone attachments for an existing wheelchair, or their functionality and construction can be integrated into a wheelchair, e.g., at the time of manufacture.

Manual wheelchairs typically have four wheels: two large main side wheels with hand rails, one on each side of the wheelchair seat, and two smaller front caster wheels located near a wheelchair occupant's feet. A wheelchair occupant can propel the wheelchair using the hand rails mounted on the two main side wheels.

The embodiments described herein are for a manual wheelchair, but may be used with other types of wheelchairs as appropriate. Embodiments of the invention may provide after-manufacture attachments for existing wheelchairs, or the structure and functionality described herein may be included and integrated into a wheelchair structure at the time of manufacture. Embodiments of the invention provide for regulating the movement of the wheelchair as the wheelchair descends from an upper surface to a lower surface, such as from a typical curb at the edge of a sidewalk to street level, or down stairs or other obstacle, which, for example, may be several inches high, and to prevent the wheelchair from tipping over during such movement. Embodiments of the invention provide for keeping the wheelchair level as the wheelchair descends over the curb or obstacle and will maintain the safety of any occupant of the wheelchair. In one embodiment, input or control is not required from an occupant of the wheelchair. In other words, this embodiment operates without input from the wheelchair occupant. Other embodiments may operate manually. Embodiments of the invention may be mounted on most existing wheelchairs in such a manner that will not interfere with any of the wheelchair's functionality, such as the ability to fold a folding wheelchair, braking capability for wheels, movement of foot pedals, seat or height adjustment, or other functionality.

In one embodiment, a front caster wheel slider assembly may be mounted on the front of a wheelchair, one on each side of the chair. The front caster wheel slider assembly extends a caster wheel from an upper surface to a lower surface in such a manner that maintains a level position and safety of a wheelchair occupant. One example of a front caster wheel slider assembly may have a vertically mounted spring loaded or pneumatic damping unit, such as an adjustable gas spring damping unit, which may have a piston pointing downwards that is adapted to connect to the top of a rail mounted in a linear bearing. The bottom of the rail may be connected to a front caster wheel. In some embodiments, the rail may be held in a retracted position by a latch, or other fixation device, during normal operation, e.g., when a wheelchair is on level ground. In one example, as the wheelchair rolls from an upper surface to a lower surface, e.g., down a curb, the latch will retract and allow the piston to extend the rail downwards so that the position of the front caster wheel is lowered until it engages the lower surface of the curb and supports the wheelchair. As the wheelchair continues to roll over and descend the curb being supported by the lowered caster wheel, the weight of the wheelchair (and occupant) will push the extended rail, and thus the piston, upwards until the rail engages the latch and the rail and caster wheel are returned to their original respective locked and retracted positions. One of skill in the art will understand that the aforementioned parts may be replaced with other parts and other arrangements that perform the same functions described herein.

In some embodiments, the spring loaded or pneumatic damping unit is constructed in a manner that may allow the wheelchair to descend a curb without any jerking or sudden movements. The damping unit may be constructed in a manner that allows the piston to extend out of the unit quickly when the piston or rail is released. In some embodiments, when the piston is pushed upward into the unit, the unit may exert a damping force that may slow the piston's movement upward into the unit. Thus, the extension velocity of the piston relative to the wheelchair may be higher than the retraction velocity of the piston. In some embodiments of the invention, the damping unit may be a pneumatic device that is fabricated in such a way to allow air to escape through a groove on a fixed side of the piston, thereby giving differential movement during extension and retraction.

In some embodiments, the front caster wheel slider assembly is activated by a sensor that causes the front caster wheels to extend automatically. The sensor may be mounted to the wheelchair frame at one or more points and include a sensing component, such as a follower wheel assembly. The sensor may be adapted to activate the front caster wheel slider assembly at the occurrence of, for example, a change of altitude or attitude of the wheelchair, one or more front caster or rear main wheels losing contact with a surface, such as the ground, contact between a ground surface and a point on the wheelchair, or other occurrence.

In some embodiments of the invention, a follower wheel assembly is adapted to act as a sensor to trigger the latches in the front caster wheel slider assembly. In other embodiments, the latch can be operated manually. One example of how a follower wheel assembly may be used is that one or more follower wheel assemblies are connected to and operate one or both latches in each front caster wheel slider assembly. The follower wheel assembly may act as a sensor that detects when the front caster wheels roll over the top edge of a curb and in turn, triggers and releases the latch. The follower wheel may be attached to the wheelchair frame together with a follower wheel assembly so that the follower wheel is positioned in alignment with the wheelchair's front small caster wheels and the main side wheels. In some embodiments of the invention, the follower wheel is positioned towards the front of the wheelchair relative to the main side wheels. In addition, the follower wheel is positioned at a height that is somewhat higher than the level of the four wheels, so that in normal operation during travel on a flat surface, the follower wheel does not come in contact with the ground surface. A follower wheel positioned at the somewhat higher level would come into contact with the ground when, for example, the wheelchair travels over and descends a curb, or the front wheels and the side wheels are positioned on surfaces of uneven heights.

In one example, as the wheelchair rolls over the curb, the follower wheel may engage the upper surface of the curb and temporarily support the wheelchair until the front caster wheels drop down and engage the lower surface, of the curb. When the follower wheel engages the upper surface, the follower wheel may also activate the latch by pulling on a cable attached to the follower wheel assembly and the latch. One of skill in the art will understand the aforementioned parts may be replaced with other parts and other arrangements that perform the same functions previously discussed.

In some embodiments of the invention, a track belt damping bar is provided to slow a wheelchair's descent over a curb, step or other obstacle. In one example, a track belt damping bar may be mounted at the rear of a wheelchair to ease the wheelchair's descent down a curb. In general, the track belt damping bar may be mounted to the wheelchair frame at a height above the height of the main wheels so it is not in contact with the ground when the wheelchair travels over the ground. In some embodiments of the invention, the track belt damping bar may extend out and up from a point along an axis of the perimeter of the main wheels so the track belt damping bar engages an upper edge of the curb as the wheelchair descends the curb. As the wheelchair moves down the curb, a friction belt made of a durable, non-slippery material may engage the upper edge of the curb and begin to rotate around two or more rollers. Rotational dampers are provided to dampen the rotation of the rollers. Thus, as the belt rotates around the rollers, the rotational dampers dampen the rotation of the rollers and the movement of the belt thereby slowing the descent of the wheelchair. One of skill in the art will understand the aforementioned parts may be replaced with other parts and other arrangements that perform the same functions previously discussed.

In some embodiments of the invention, front caster wheel slider assemblies, follower wheel assemblies and track belt damping bars may be used together in combinations of some or all of the assemblies and their respective functionality. In other embodiments, either one of the assemblies or components may be used independently. The use of one or all of the assemblies and bars is a design choice within the purview of one of ordinary skill in the art. For example, one may design the damping unit to have enough damping force to lower a wheelchair down a curb, step or other obstacle without the need for a damping bar. In other eases cases, one may design the damping unit to work in conjunction with a damping bar to lower the wheelchair down the curb, step or other obstacle, etc.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
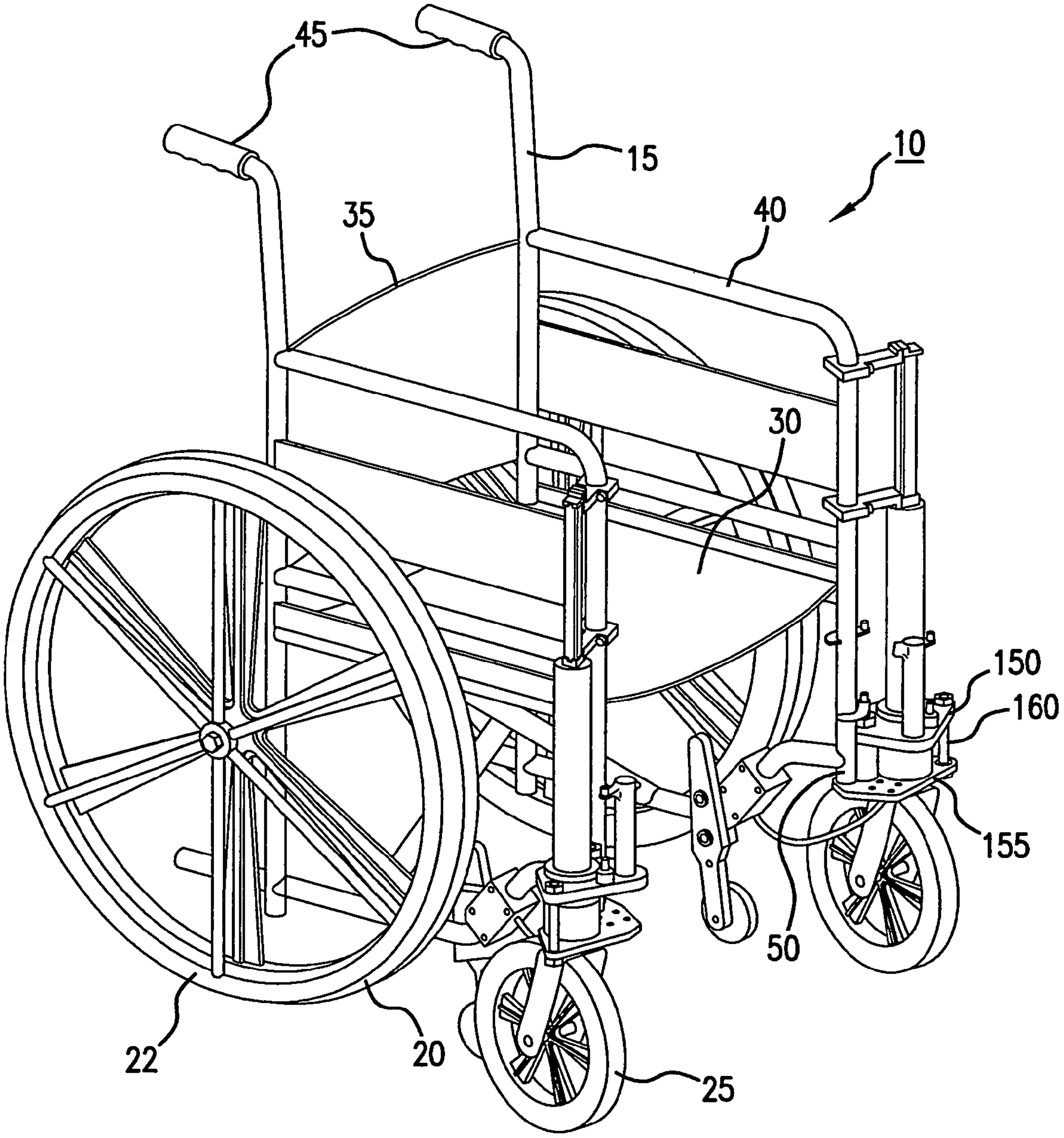
FIG. 1 is a perspective view of a wheelchair with attachments for descending a curb or other obstacle according to an embodiment of the invention.
Figure 2:
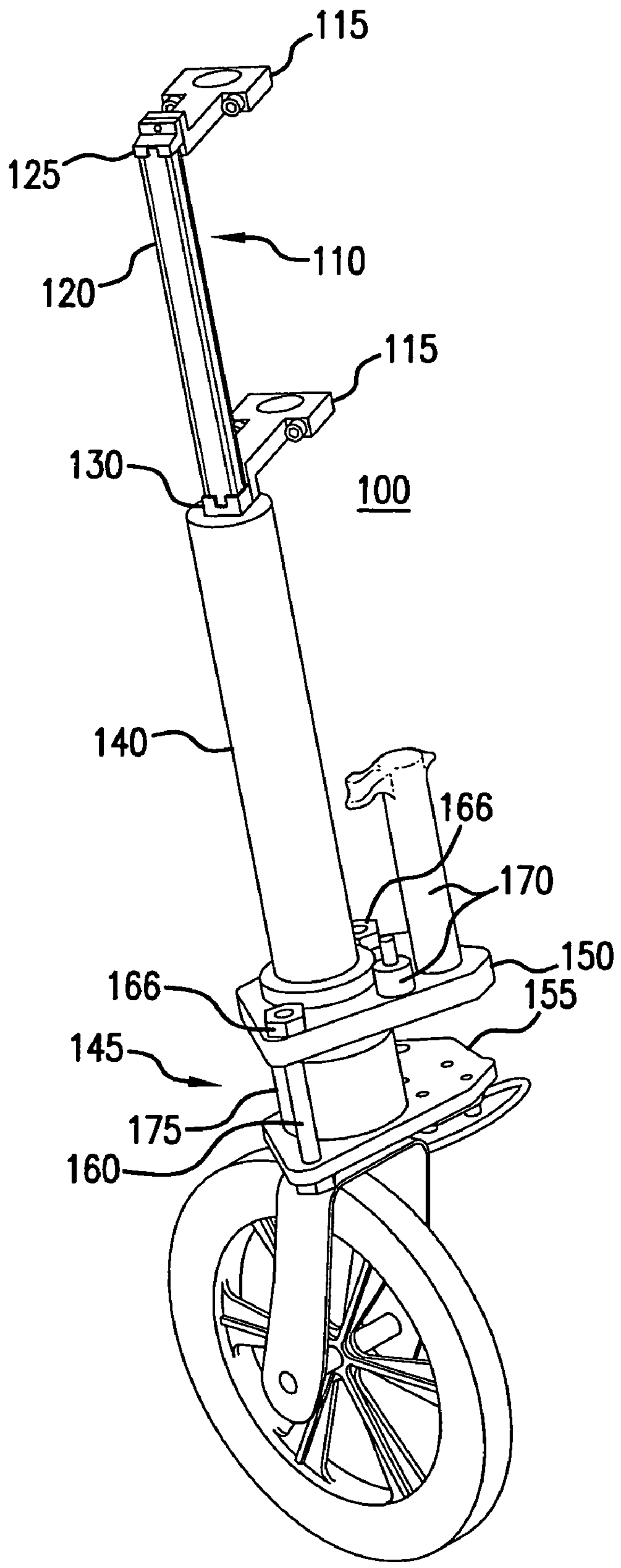
FIG. 2 is a perspective view of a caster wheel slider assembly according to an embodiment of the invention.
Figure 3:
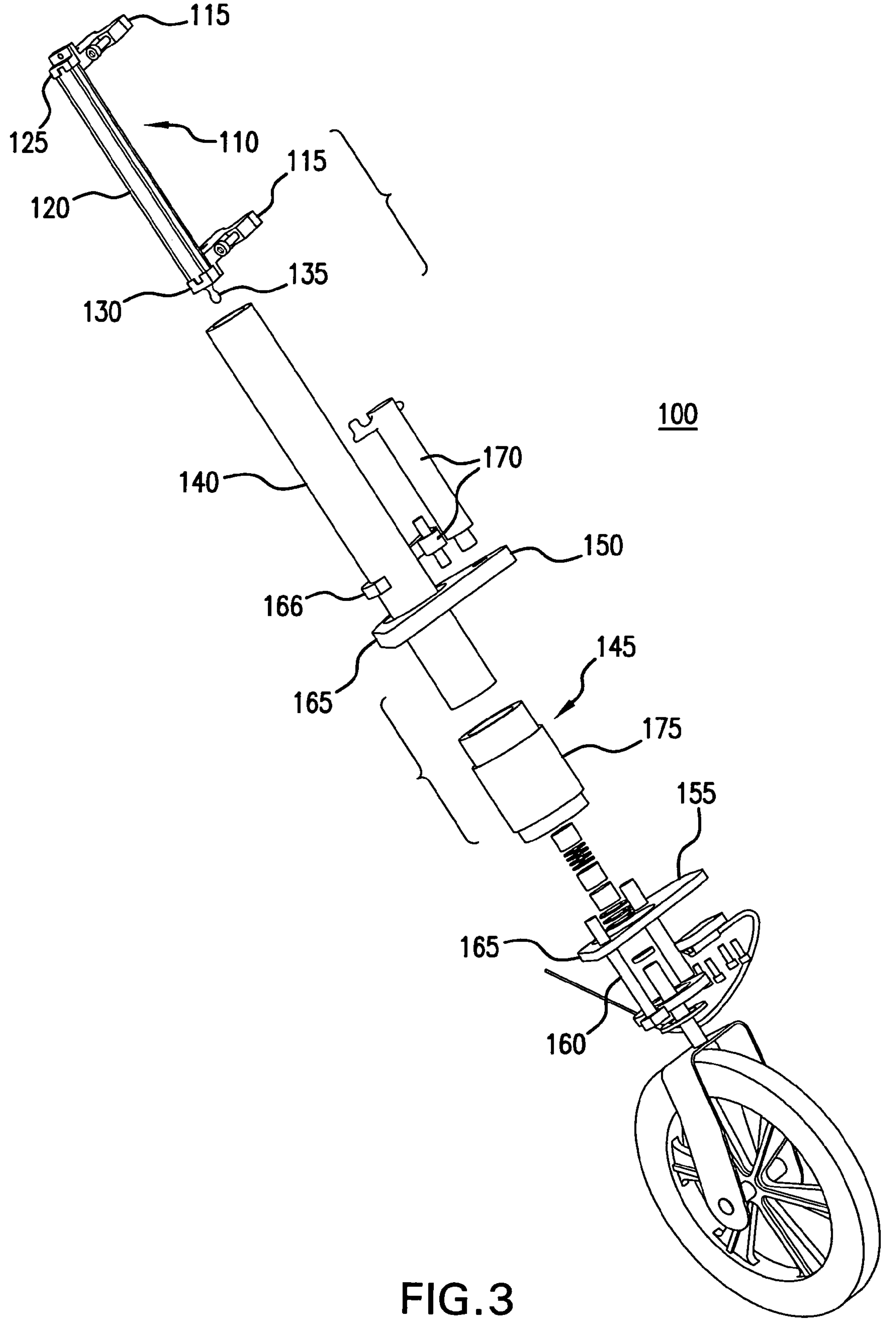
FIG. 3 is an exploded view of the caster wheel slider assembly of FIG. 2 according to an embodiment of the invention.
Figure 4:
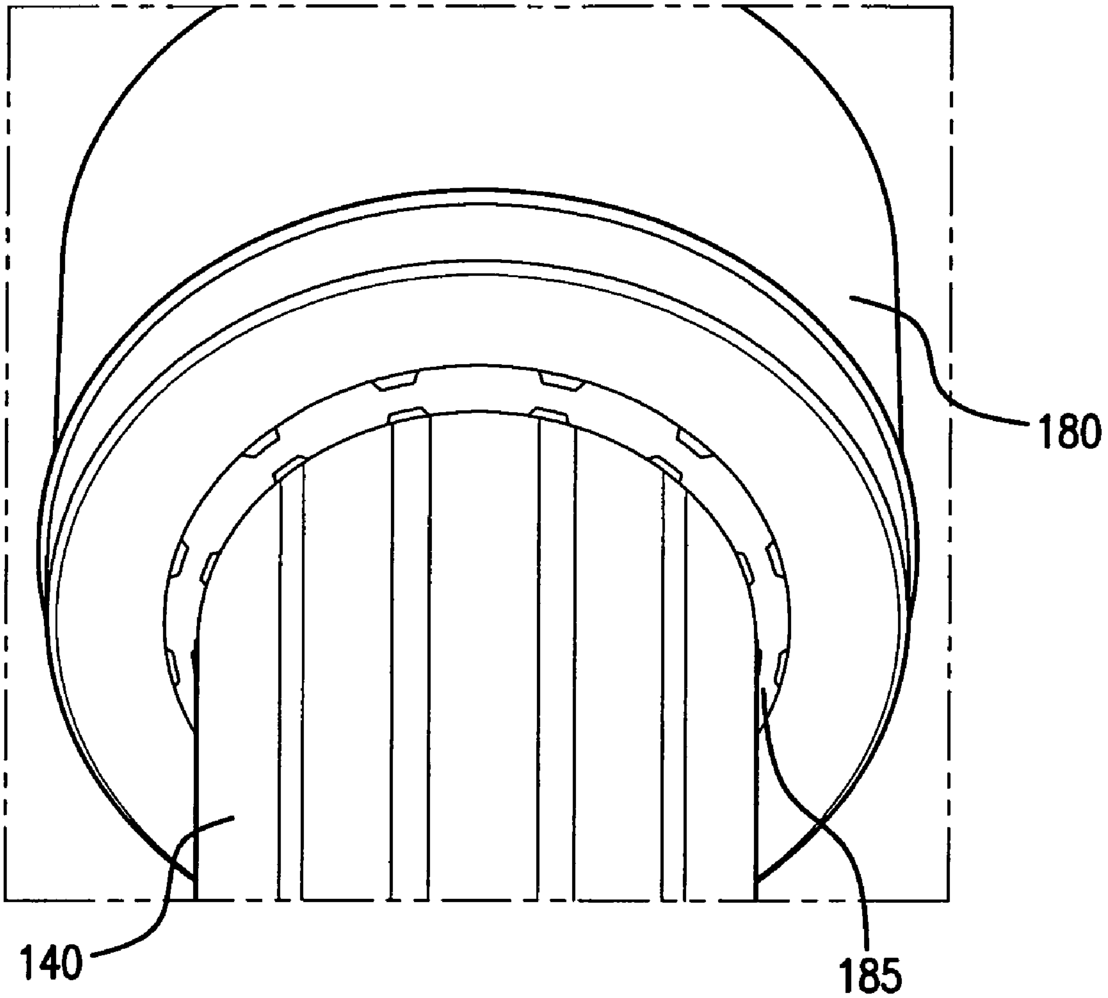
FIG. 4 is a perspective view of a linear bearing in the caster wheel slider assembly of FIG. 2 according to an embodiment of the invention.
Figure 5:
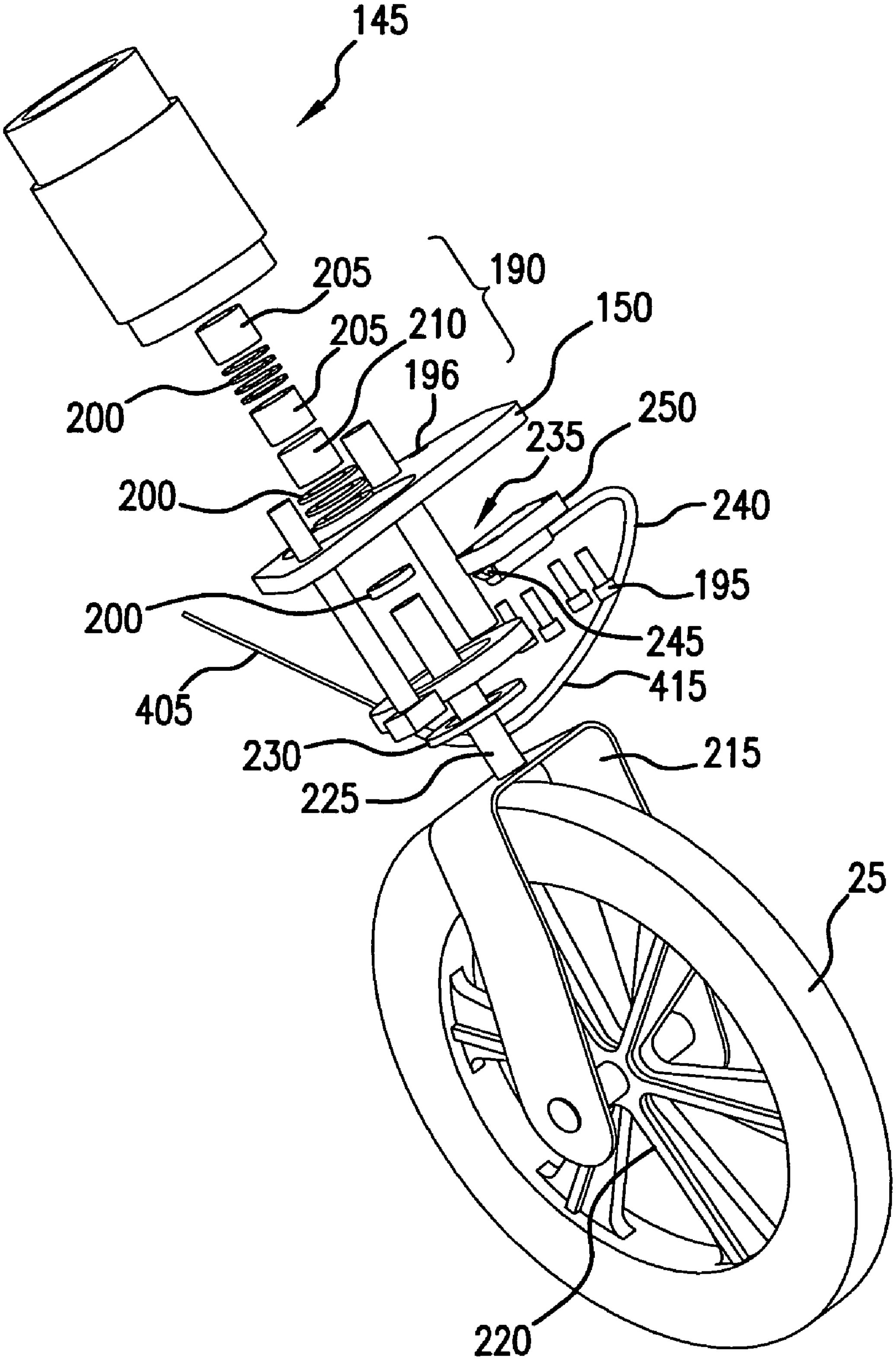
FIG. 5 is an exploded view of a lower portion of the caster wheel slider assembly depicted in FIG. 2 according to an embodiment of the invention.

Embodiments of the present invention are described herein with reference to the drawings. FIG. 1 depicts a manually powered wheelchair 10 that may be any type of wheelchair such as the manual wheelchairs manufactured by, for example, Quickie XTR, Quickie 2, Invacare Xtra and E&J Epic. The wheelchair 10 typically comprises a rigid frame 15 that is constructed in any manner well known in the art. The wheelchair 10 also comprises several components mounted on the frame including; two main side wheels 20 with hand rails 22, two small front caster wheels 25, a seat 30, a seat back 35, two arm rests 40 and two hand grips 45. The components can be attached to the frame in any manner well known in the art. In addition, the components of wheelchair 10 may be any appropriate or standard wheelchair component well known in the art, such as any component associated with standard manual wheelchairs including the Quickie XTR, Quickie 2,Invacare Xtra and E&J Epic.

FIGS. 2-5 illustrate a front caster wheel slider assembly 100 that can be attached to the wheelchair 10. The front caster wheel slider assembly 100 is constructed of commonly available parts in manners well known in the art. The front caster wheel slider assembly 100 includes a damping unit 110 that may be an adjustable piston gas spring or pneumatic damping unit. The damping unit 110 is connected to the wheelchair frame with two brackets 115, one at each end of the damping unit 110. The damping unit 110 may be a piston gas spring damping device comprising a tube 120 closed at one end 125 and open at the other end 130, or other damping devices may be used. A piston rod 135 fits into the open end 130 and is able to slide into and out of the tube 120. Tube 120 is filled with a gas that is well known in the art and that acts as a spring pushing against piston rod 135 as rod 135 moves in and out of the tube 120. The open end 130 includes a seal (not shown) that surrounds piston rod 135 and keeps the gas inside tube 120.

The damping unit is constructed in a manner that, will cause the piston to quickly extend out of the unit when the piston or rail is released, e.g., by the latch. When the piston is pushed back into the unit, the unit will exert a damping force that will slow the piston's movement back into the unit. Thus, the extension velocity of the piston relative to the wheelchair will be higher than the retraction velocity of the piston. The damping unit may be a pneumatic device that is fabricated in such a way to allow air to escape through an orifice on a fixed side of the piston, thereby giving differential movement during extension and retraction.

The lower end of piston rod 135 is connected to fire upper end of tubular rail 140. The tubular rail 140 may be of any construction well known in the art such as plastics, metals, composite materials or other lightweight sturdy material. The tubular rail 140 passes through and is able to move back and forth through bracket assembly 145.

Bracket assembly 145 includes an upper mounting plate 150 and a lower mounting plate 155. The two plates can be of any construction well known in the art. The two mounting plates 150, 155 are rigidly connected by two connector rods 160 that may be of any construction well known in the art such as bolts and nuts. For example, the connector rods 160 can be bolts that are affixed in any manner well known in the art to upper mounting plate 150. The upper and lower mounting plates 150, 155 include matching holes 165 through which the bolts can pass and then be secured to the lower mounting plate using nuts 166. The mounting plates 150, 155 may be rigidly affixed to the wheelchair frame 15 in any manner well known in the art. For example, as shown in FIG. 1, the lower mounting plate 155 is secured to one portion 50 of the wheelchair frame 15 and one of the connector rods 160 passes through to upper mounting plate 150 of the wheelchair frame 15. Commonly available foot rest mounts (not shown) may be secured to the upper mounting plate 150 in any manner well known in the art.

The bracket assembly also includes a linear polymer bearing 175. The linear polymer bearing 175 can be of any construction well known in the art such as low friction polymer Iglide® bearings available from Igus, Inc. For example, the linear polymer bearing 175 can be a tube 180 made of aluminum or other lightweight material with a replaceable sleeve insert 185, which may be plastic or other material. The linear bearing 175 is rigidly affixed to both the upper and lower mounting plates 150, 155 in any manner well known in the art. Tubular rail 140 passes through linear bearing 175 and can move back and forth through the linear bearing 175.

The lower end of tubular rail 140 is connected in any manner well known in the art to a washer and thread insert stack 190. The stack 190 can be any commonly available bearing package and may include, for example, washers 200, bearings 205 and thrust bearing 210.

Front caster wheel 25 can be a commonly available caster wheel assembly for a wheelchair. Front caster wheel 25 may be mounted in fork 215 in any manner well known in the art so that front caster wheel 25 can rotate about a vertical axle 225. The vertical axle 225 is mounted to fork 215 in any manner well known in the art. Vertical axle 225 fits into washer and thread insert stack 190 so that it can rotate inside tubular rail 140. A plate 230 is mounted to vertical axle 225 to limit the extent that the fork 215 can push into tubular rail 140.

Bracket assembly 145 also includes a conventional slam latch 235 that is affixed to upper mounting bracket 150 in any manner well known in the art such as by machine screws 195 that engage corresponding holes 196 in the upper mounting bracket 150. One end of a cable 405 inside a cable cover 415 of an actuation cable 240 is connected in any manner well known in the art to a latch bar 245 in the slam latch 235. The latch bar 245 is spring loaded (not shown) to remain extended out of the slam latch housing 250. When the cable 405 is pulled, the latch 245 will be drawn into the latch housing 250. The other end of cable 405 is connected to a follower wheel assembly discussed in more detail below.

Figure 6:
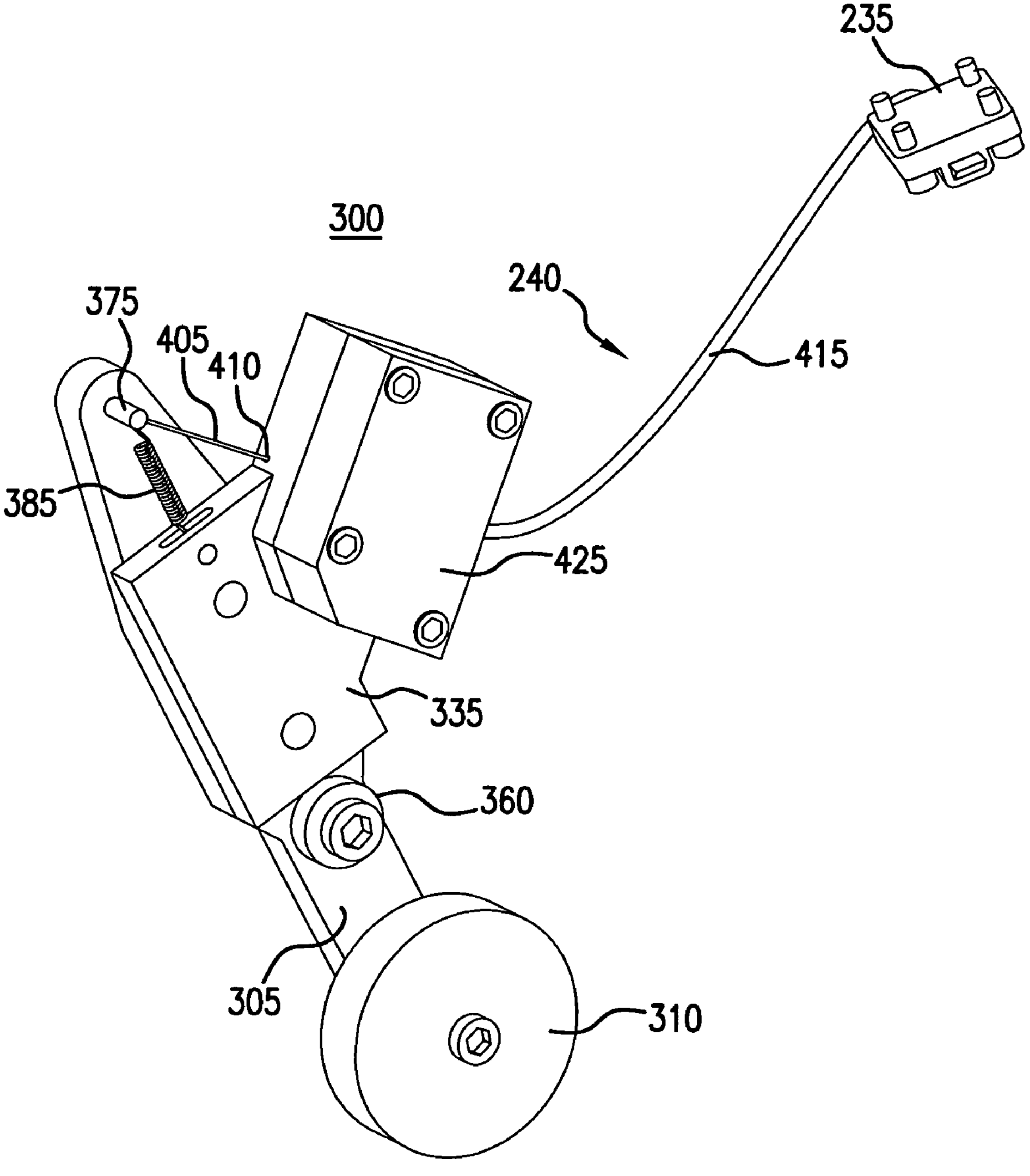
FIG. 6 is a perspective view of a follower wheel assembly according to an embodiment of the invention.
Figure 7:
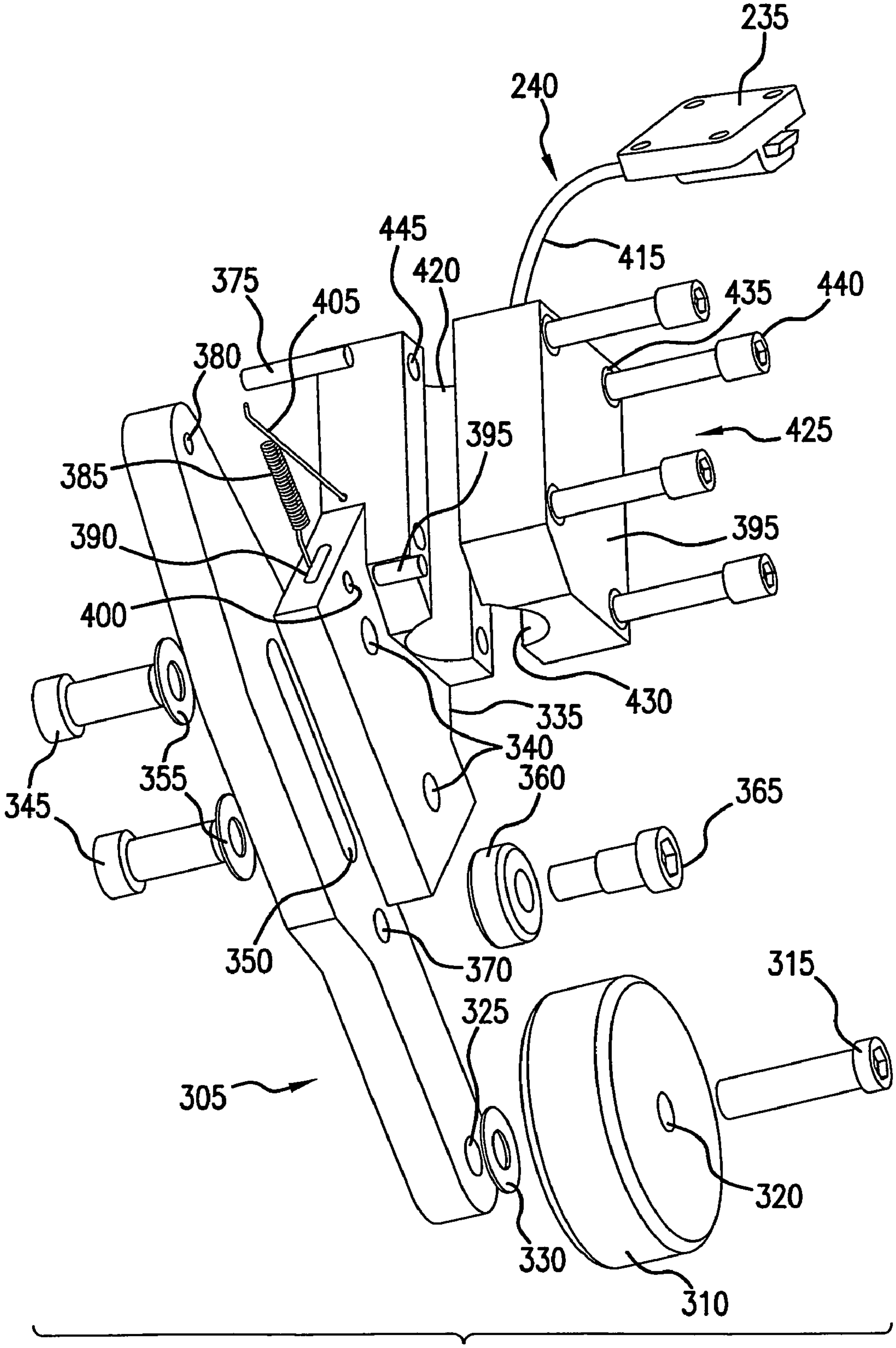
FIG. 7 is an exploded view of the follower wheel assembly depicted in FIG. 6 according to an embodiment of the invention.

FIGS. 6-7 illustrate a follower wheel assembly 300. The follower wheel assembly 300 includes a frame 305. A follower wheel 310 is mounted on the frame 305 in any manner well known in the art. For example, a screw 315 can be placed through a hole 320 in wheel 310 and screwed into a hole 325 on the frame 305. The follower wheel 310 can be made of neoprene or any other durable material suitable for occasional contact with the surfaces over which the wheelchair 10 will roll. Screw 315 is constructed in such a way to allow wheel 310 to rotate around screw 315. A washer 330 can be placed on screw 315 and between wheel 310 and frame 305 to allow the wheel 310 to easily rotate.

The follower wheel assembly also includes a lower frame bracket 335. The bracket 335 has screw holes 340 that accept screws 345. Screws 345 pass through a slot 350 in frame 305. Washers 355 are placed on screws 345 between the screw heads and the frame 305. The screws 345 are constructed in such away and positioned in such a manner to allow the slot 350, and frame 305, to slide over screws 345. A bumper 360 is affixed to the frame 305 by a screw 365 that fits into screw hole 370 in frame 305. The frame 305 also includes a pin 375 that is mounted in hole 380 of frame 305. One end of a tension spring 385 is attached to pin 375. The other end of tension spring 385 passes through slot 390 in the lower frame bracket 335 and is affixed to pin 395 that passes through hole 400 and slot 390. One end of cable 405 is attached to pin 375. Cable 405 passes through hole 410 in lower frame bracket 335 and then through cable cover 415 of actuation cable 240 to slam latch 235.

The follower wheel assembly 300 is mounted on the wheelchair frame 15 using the lower frame bracket 335 and an upper frame bracket 425. Lower frame bracket 335 includes a lower receiving channel 420 that is shaped to fit around a portion of frame 15. The upper frame bracket 425 includes an upper receiving channel 430 that fits around another portion of frame 15 and mates with the lower frame bracket 335. The upper frame bracket 425 includes holes 435 through which screws 440 pass and engage screw holes 445 in the lower frame bracket 335. When the screws 440 are tightened, the lower and upper frame brackets 335, 425 will compress against frame 15 in a manner well known in the art.

Figure 8:
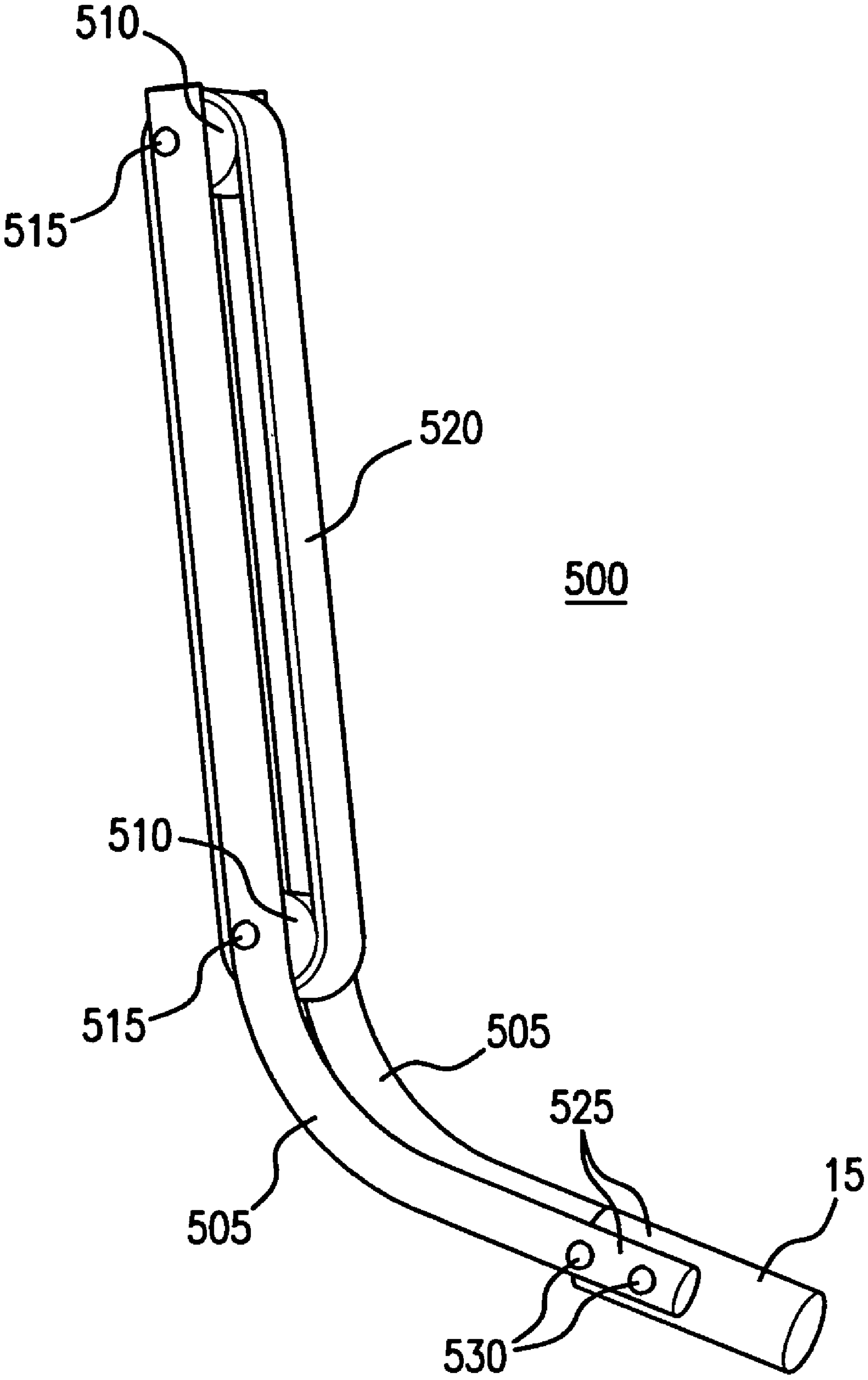
FIG. 8 is a perspective view of a track belt damping bar assembly according to an embodiment of the invention.

FIG. 8 depicts a track belt damping bar 500. Track belt damping bar 500 includes angled support frames 505 that are constructed in such a manner to support two rollers 510 mounted on axles 515. Additional rollers may also be used. The rollers 510 and axles 515 may be connected to rotational dampers (not shown) that dampen the rotation of rollers 510. A friction belt 520 may be mounted around and be adapted to move around rollers 510. Lower ends 525 of angled support frames 505 are mounted to the wheelchair frame 15 in any manner well known in the art. For example, the lower ends 525 can be shaped to fit around a portion of the wheelchair frame 15 and fasteners 530 pass through the lower ends 525 and the wheelchair frame 15 in such a way to rigidly affix the angled support frames 505 to the wheelchair frame 15. In general, the support frames 505 are mounted to the wheelchair frame 15 at a location along an axis of the perimeter of the side wheels. Such positioning allows, for example, the support frames 505 to engage a curb when the wheelchair side wheels descend from an upper surface to a lower surface thereby temporarily supporting a portion of the wheelchair during the descent.

Figure 9B:
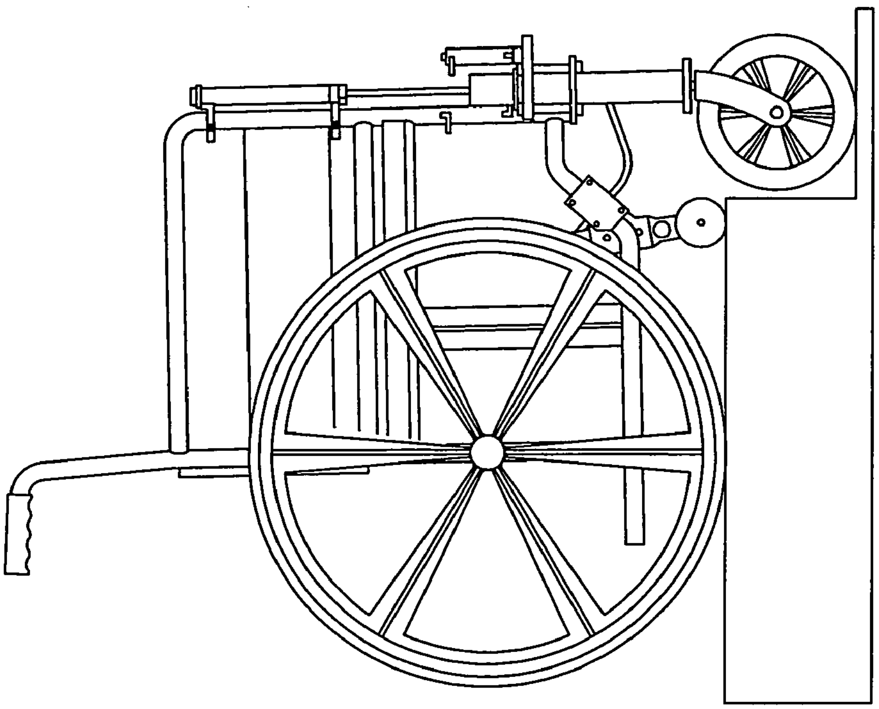
FIGS. 9A-D depict a side view of a wheelchair with a front caster wheel slider assembly and follower wheel assembly descending a curb according to an embodiment of the invention.
Figure 9A:
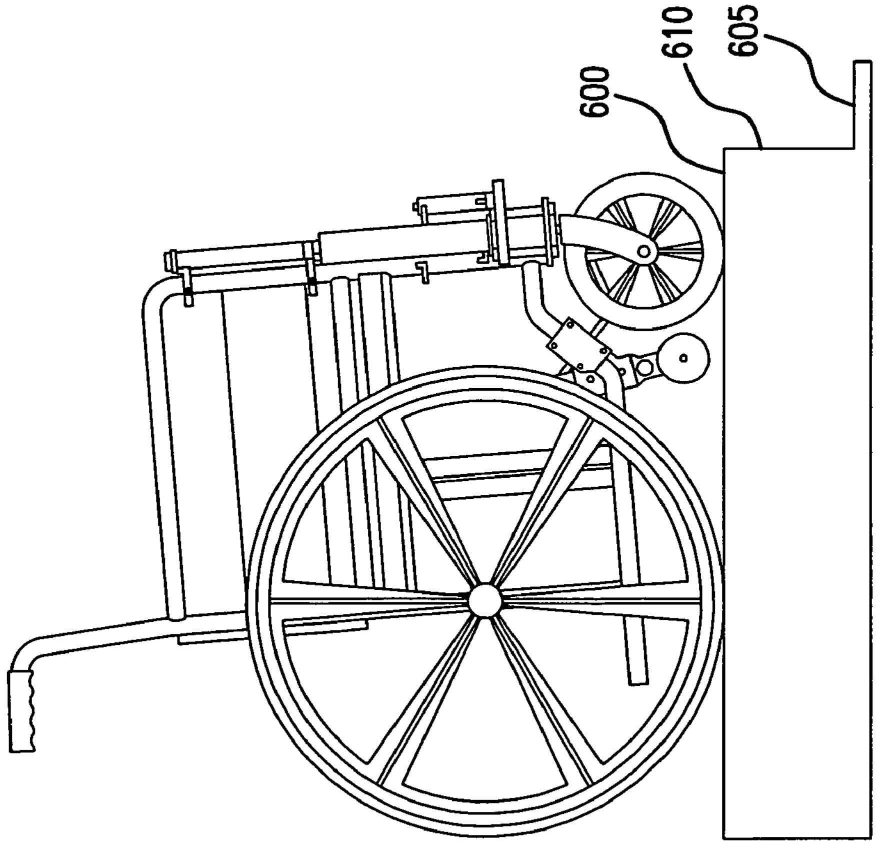

FIGS. 9A-9D illustrate the wheelchair 10, front caster wheel slider assembly 100 and follower wheel assembly 300 in operation as the wheelchair 10 moves from an upper surface 600 to a lower surface 605 over a curb 610. FIG. 9A depicts the wheelchair 10 in a normal operating mode on upper surface 600. The frame 305 of follower wheel assembly 300 is shown in a lowered position. Referring to FIGS. 6-7, the tension spring 385 causes the frame 305 to be pulled down towards the lower frame bracket 335 and into the lowered position. The follower wheel assembly 300 is mounted to a portion of wheelchair frame 15 between the front caster wheel slider assembly 100 and side wheels 20 and is mounted in such a way to prevent the follower wheel 310 from touching the ground during the normal operating mode of the wheelchair, i.e., when the wheelchair is traveling over level surfaces. FIG. 9A also depicts the tubular rail 140 of front, caster wheel slider assembly 100 in an tipper upper retracted position. Referring to FIGS. 2-5, the tubular rail 140 is held in its upper retracted position by latch bar 245 of slam latch 235.

FIG. 9B depicts wheelchair 10 after the front caster wheels 25 have traveled over curb 610. As the wheelchair 10 moves over the curb 610, the front caster wheels 25 will begin to drop over the edge of curb 610. As the wheelchair 10 pitches forward, the follower wheel 310 will engage upper surface 600 and the follower wheel assembly 300 will begin to support wheelchair 10 as the wheelchair 10 continues to roll over upper surface 600. As the wheelchair 10 pitches forward, the slot 350 in frame 305 of the follower wheel assembly 300 will slide over the screws 345 until the bumper 360 touches the lower frame bracket 335. As the frame 305 pushes upwards, pin 395 on frame 305 will pull cable 405, which will in turn pull on latch bar 245 of slam latch 235 until the latch bar 245 is in the latch housing 250. Once the latch bar 245 enters the latch housing 250, the latch bar 245 will release the tubular rail 140. Since the upper end of tubular rail 140 is connected to piston rod 135 of damping unit 110, the gas inside tube 120 of damping unit 110 will eject the piston rod 135 and in turn push the tubular rail 140 down so that front caster wheels 25 will quickly push down to engage and roll over lower surface 605. As shown in FIG. 9B, the wheelchair 10 remains in the same level position as it was in FIG. 9A, when the front caster wheels 25 descend over the curb 610.

Figure 9D:
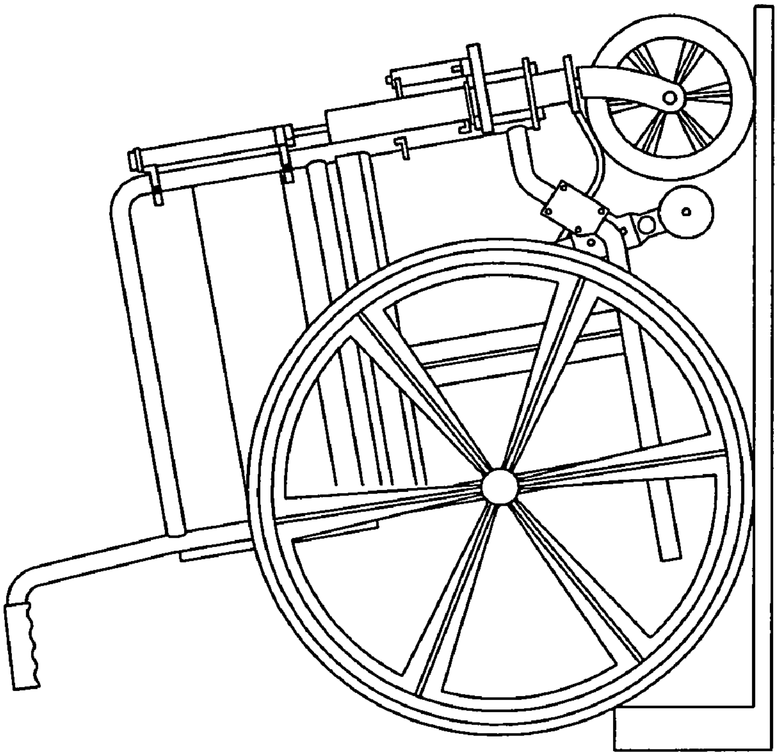
Figure 9C:
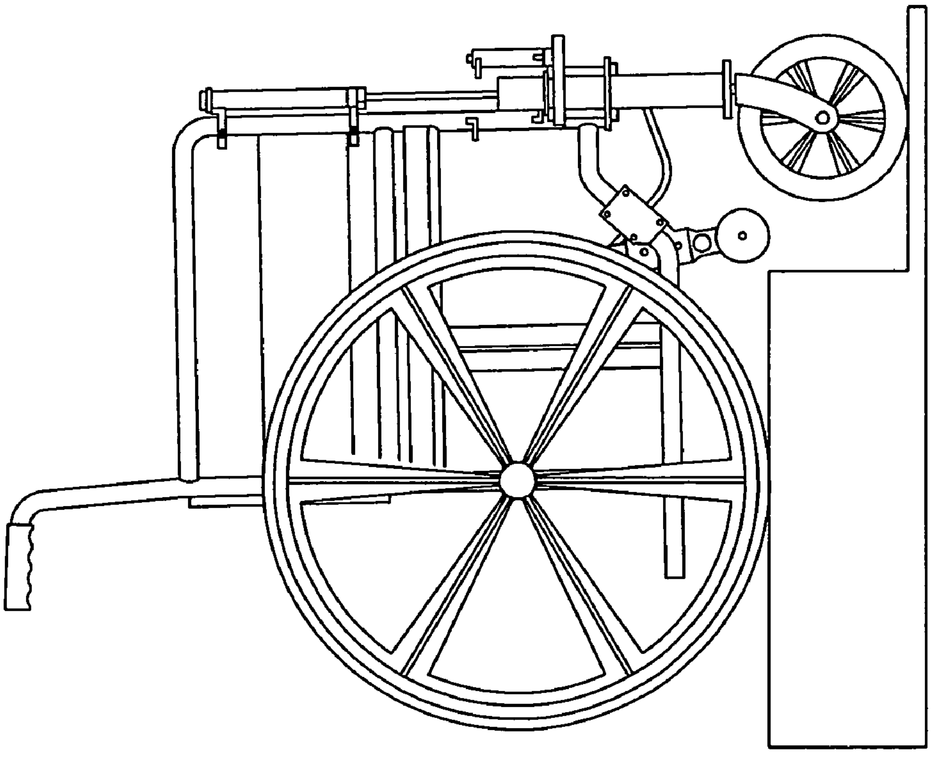

FIG. 9C depicts the wheelchair 10 after the follower wheel 310 moves over curb 610. When the follower wheel 310 moves past the curb and no longer engages upper surface 600, the follower wheel assembly 300 no longer supports the wheelchair 10. Instead, the front caster wheel slider assembly 100 will support the wheelchair 10. The damping unit 110 has a damping force that prevents the piston rod 135 and tubular rail 140 from moving upwards quickly into a retracted position. After the follower wheel 310 moves over the curb 610, the spring 385 of the follower wheel assembly 300 will pull on frame 305 so that the slot 350 in frame 305 will slide over the screws 345 until the top screw 345 engages the top of the slot 350. As shown in FIG. 9C, the wheelchair 10 remains in the same level position as it was in FIGS. 9A and 9B.

FIG. 9D depicts wheelchair 10 after the two main side wheels 20 roll over curb 610. As the two main side wheels 20 roll over curb 610, the weight of the wheelchair 10 will shift and cause the front caster wheels 25 to push on the tubular rail 140 and on the piston rod 135 in such a fashion that the piston rod 135 is pushed back into the damping unit 110. The damping unit 110 is adjustable in such a fashion to control the piston rod's 135 retraction speed back into the damping unit 110, i.e., so that it retracts slowly to avoid sudden movements. The adjustability of the damping unit 110 can also be used to adjust the pitch of the wheelchair 10 as it moves over and down a curb. When the two main side wheels 20 engage the lower surface 605, the piston rod 135 and tubular rail 140 will be back in their retracted position and latch bar 245 of slam latch 235 will push back out of latch housing 250 to engage and hold in the retracted position the tubular rail 140. As shown in FIG. 9D, the wheelchair 10 remains in the same level position as it was in FIGS. 9A, 9B and 9C.

Figure 10:
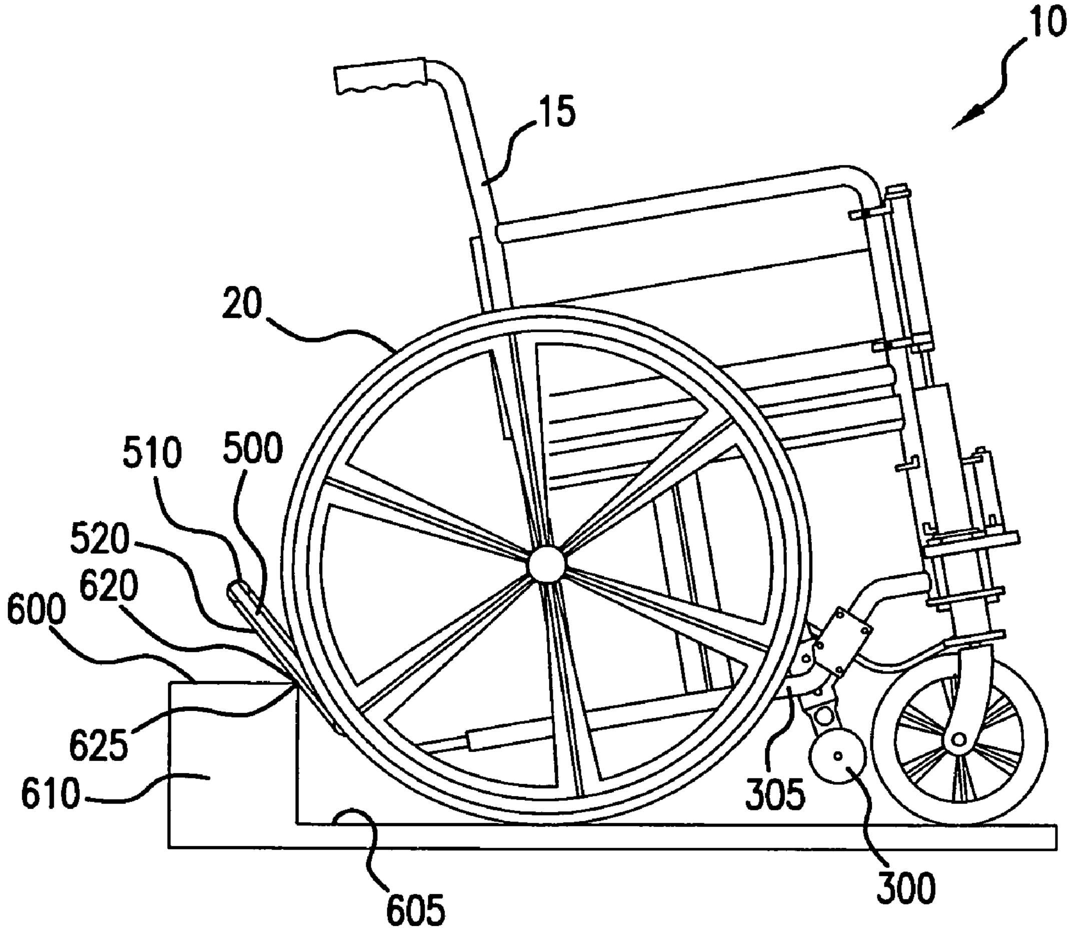
FIG. 10 is a side view of a wheelchair with the front caster wheel slider assembly, the follower wheel assembly and a track belt damping bar descending a curb according to an embodiment of the invention.

FIG. 10 illustrates the wheelchair 10 and track belt damping bar 500 in operation as the wheelchair 10 moves from an upper surface 600 to a lower surface 605 over a curb 610. As shown, the track belt damping bar 500 may be connected to a follower wheel assembly frame 305, but may also be connected to a wheelchair frame 15 or other location. As the two main side wheels 20 roll over curb 610 and the follower wheel assembly 300 is no longer supporting the wheelchair 10, a point 620 on the friction belt 520 of the track belt damping bar 500 will engage a point 625 on the curb 610. As the wheelchair 10 rolls forward, the point 620 of belt 520 will continue to engage point 625 on the curb 610 and cause the belt 520 to roll around, the rollers 510. As the belt 520 rolls around the rollers 510, rotational dampers (not shown) will dampen the rotation of the rollers and slow the movement of the wheelchair 10 over the curb 610. Thus, the wheelchair 10 can slowly and safely move over a curb while maintaining a level position for an occupant of the wheelchair 10.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. An attachment for a manual wheelchair which has first and second front caster wheels and a pair of main side wheels rearward of said first and second front caster wheels, the attachment adapted to assist the wheelchair as the wheelchair descends from an upper surface to a lower surface, the attachment comprising:

a damping unit adapted to mount on a wheelchair frame, said damping unit including a differential movement component;

a rail adapted to mount on the wheelchair frame and adapted to slide along the wheelchair frame;

wherein a first end of the rail is connected to the damping unit and a second end of the rail is connected to said first front caster wheel on the wheelchair; and a piston rod connected to the differential movement component of the damping unit and effective to eject the rail and said first front caster wheel from a first position to a second position such that the first front caster wheel engages the lower surface independent of said second front caster wheel when a latch adapted to maintain said rail in said first position is automatically released.

2. The attachment of claim 1 wherein the differential movement component is a spring loaded component.

3. The attachment of claim 1 wherein the differential movement component is a pneumatic component.

4. The attachment of claim 1 wherein the differential movement component of the damping unit exerts a damping force, thereby slowing movement of the piston into the damping unit as one or more main wheels of the wheelchair descend from the upper surface to the lower surface.

5. The attachment of claim 1 wherein a sensor mounted to the wheelchair frame is adapted to detect that the first front caster wheel is descending from an upper surface to a lower surface.

6. The attachment of claim 5 wherein upon detection that the first front caster wheel is descending from the upper surface to the lower surface, the sensor triggers the piston to extend the rail and the first front caster wheel to the lower surface.

7. The attachment of claim 5 wherein the latch is adapted to automatically release when said sensor detects the first front caster wheel descending from the upper surface to the lower surface.

8. The attachment of claim 1 further comprising a damping bar connected to the wheelchair frame, the damping bar extending from a location substantially near one said side wheel of the wheelchair, and wherein the damping bar is adapted to support at least a portion of the wheelchair when the side wheel of the wheelchair descends from the upper surface to a lower surface.

* * * * *